US012263738B2

(12) United States Patent
Liao

(10) Patent No.: US 12,263,738 B2
(45) Date of Patent: Apr. 1, 2025

(54) ELECTRONIC GEAR-SHIFTING SYSTEM WITH SOUND EFFECTS AND DISPLAY

(71) Applicant: Kwang Yang Motor Co., Ltd., Kaohsiung (TW)

(72) Inventor: Wei-Xiang Liao, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 77 days.

(21) Appl. No.: 18/313,985

(22) Filed: May 8, 2023

(65) Prior Publication Data
US 2023/0406116 A1 Dec. 21, 2023

(30) Foreign Application Priority Data

Jun. 21, 2022 (TW) .................................. 111123063

(51) Int. Cl.
*B60L 15/20* (2006.01)
*B62J 3/14* (2020.01)

(52) U.S. Cl.
CPC .............. *B60L 15/2054* (2013.01); *B62J 3/14* (2020.02); *B60L 2200/12* (2013.01); *B60L 2240/423* (2013.01); *B60L 2250/24* (2013.01); *B60L 2250/26* (2013.01)

(58) Field of Classification Search
CPC ............. B60L 15/2054; B60L 2200/12; B60L 2250/24; B60L 2250/26; B62J 3/14
See application file for complete search history.

(56) References Cited

U.S. PATENT DOCUMENTS

| 8,547,210 | B2 * | 10/2013 | Tsuyuguchi ............. B62J 50/22 340/425.5 |
| 2002/0147580 | A1 | 10/2002 | Mekuria et al. |
| 2016/0016091 | A1 * | 1/2016 | Allmendinger ........ A63H 30/04 446/456 |
| 2021/0206254 | A1 * | 7/2021 | Benedikt .................. B60K 6/36 |
| 2022/0063494 | A1 * | 3/2022 | Duo' ......................... B60L 7/18 |
| 2022/0147580 | A1 | 5/2022 | Ricci |
| 2023/0173929 | A1 * | 6/2023 | Liao ....................... B60L 15/20 701/22 |

FOREIGN PATENT DOCUMENTS

| CN | 113734189 A | 12/2021 |
| TW | 201501985 X | 1/2015 |
| TW | 201625439 A | 7/2016 |
| TW | 202028044 A | 8/2020 |

* cited by examiner

*Primary Examiner* — Derek D Knight
(74) *Attorney, Agent, or Firm* — Bradley J. Thorson; DeWitt LLP

(57) ABSTRACT

The present invention is an electronic gear-shifting system with sound effects and display, adapted to be mounted on an electric motorcycle, and including an electronic shift unit, an electronic clutch unit, a throttle position sensor, correspondingly outputting a shift signal, a clutch signal and a throttle position signal according to the operation of the rider, a control unit receiving the aforementioned signals to determine a target gear position of the electric motorcycle and control a power motor of the electric motorcycle. The electric motorcycle converts the real speed of the power motor into a virtual speed through an algorithm and lets a dashboard and a sound effect controller of the electric motorcycle output according to the virtual speed. In addition to simulate the power performance of a general gear-shifting-type motorcycle, the electric vehicle also has visual and auditory variations.

20 Claims, 15 Drawing Sheets

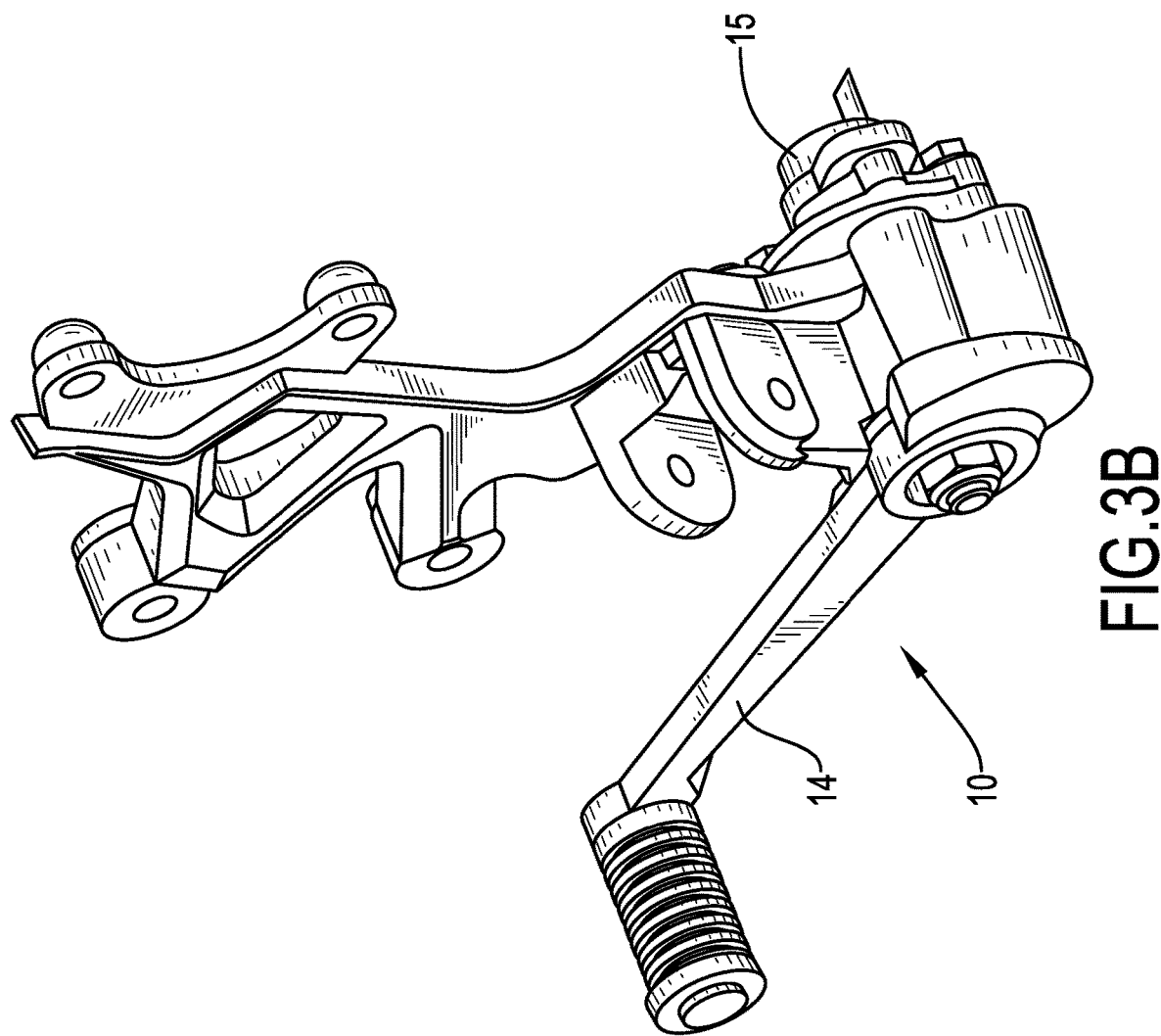

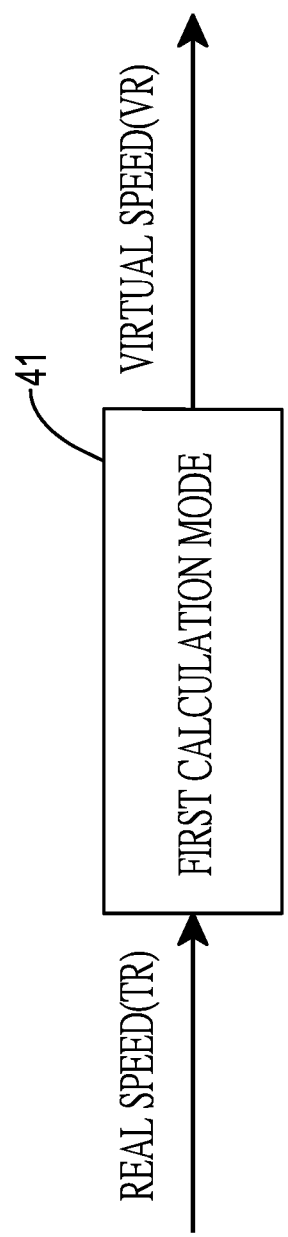

ELECTRONIC GEAR-SHIFTING SYSTEM WITH SOUND EFFECTS AND DISPLAY

CROSS REFERENCE TO RELATED APPLICATIONS

The present application claims priority to Taiwan application No. 111123063, filed on Jun. 21, 2022, the content of which is hereby incorporated by reference in its entirety.

BACKGROUND OF THE INVENTION

1. Field of the Invention

The present invention relates to a gear-shifting system of an electric motorcycle, and particularly to an electronic gear-shifting system with sound effects and display.

2. Description of the Related Art

The motive power source of a general electric motorcycle is mainly from an electric motor provided powered by the battery pack of the motorcycle. Adjusting the magnitude of the working power applied to the electric motor can directly change the speed of the electric motor to change the riding speed of the electric motorcycle. In order to provide better riding experience, an acceleration button (boost) is added to some electric motorcycles for the user to switch between "Acceleration Mode" and "Normal Mode". When the acceleration button is activated to enter the Acceleration Mode, the electric motorcycle has faster riding speed.

However, the electric motorcycles on the market are still very different from the traditional gear-shifting-type motorcycles. While a rider needs special driving torque, such as climbing, starting after parking, etc., as the model of the electric motorcycle developed by the general manufacturer does not have gear-shift mechanisms such as a clutch and a gearbox, the model of the electric motorcycle does not have a gear shifting function, and cannot provide different motor torque outputs under the aforementioned conditions. Moreover, compared with the traditional gear-shifting-type motorcycles, the model of the electric motorcycle lacks the change of the power, and also lacks the auditory and visual changes, such that the riding experience of the rider lacks fun.

SUMMARY OF THE INVENTION

Problem to be Solved in the Present Invention

In view of the general electric motorcycles lacking the gear-shifting function and the change of hearing and vision, the present invention provides an electronic gear-shifting system with sound effects and display without adding gear-shift mechanisms such as a clutch, a gearbox, and so on, such that the electric motorcycle has an operation of shifting function, and at same time has both auditory and visual changes.

Solution to the Problem

According to one preferred embodiment of the present invention, the electronic gear-shifting system with sound effects and display is mounted on an electric motorcycle and includes:
  an electronic shift unit outputting a shift signal;
  an electronic clutch unit outputting a clutch signal;
  a throttle position sensor outputting a throttle position signal;
  a control unit connected to the electronic shift unit, the electronic clutch unit, and the throttle position sensor; and the control unit determining whether the electric motorcycle is switched to a target gear position according to the shift signal, the clutch signal, and throttle position signal to control a power motor of the electric motorcycle;
  a sound effect controller connected to the control unit; and
  a dashboard connected to the control unit and receiving communication data transmitted by the control unit; and the dashboard configured to display the target gear position, a virtual speed and a vehicle speed.

According to another preferred embodiment of the present invention, the electronic gear-shifting system with sound effects and display is mounted on an electric motorcycle and includes:
  an electronic shift unit outputting a shift signal;
  an electronic clutch unit outputting a clutch signal;
  a throttle position sensor outputting a throttle position signal; and
  a control unit connected to the electronic shift unit, the electronic clutch unit, and the throttle position sensor; and the control unit determining whether the electric motorcycle is switched to a target gear position according to the shift signal, the clutch signal, and throttle position signal to control a power motor of the electric motorcycle;
  a dashboard connected to the control unit; and
  a sound effect controller connected to the control unit and receiving communication data transmitted by the control unit; and the sound effect controller generating a sound source signal according to the throttle position signal, the target gear position and a virtual speed and transmitting the sound source signal to a sound effect speaker.

Technical Effect of the Present Invention

Under the condition that gear-shifting mechanisms such as a clutch, a gearbox, and so on are not additionally added, the present invention equips an electric motorcycle with an electronic shift unit and an electronic clutch unit for the rider to perform shifting operations. The electronic shift unit and the electronic clutch unit generate a shift signal and a clutch signal respectively, so that the electric motorcycle operates at a target gear position. By presetting the motor characteristic curves for different gear positions, the power motor of the electric motorcycle at the different gear positions generates different torque outputs according to the corresponding motor characteristic curves; the electric motorcycle converts the real speed of the power motor into a virtual speed through an algorithm and combines the gear positions, throttle, etc. to supply the dashboard and the sound effect controller of the electric motorcycle to create visual and auditory effects of a gear-shifting-type motorcycle. The present invention lets the electric motorcycle simulate the function of the gear shifting operation of a common gear-shifting-type motorcycle and makes a user have both visual and auditory experiences of a gear-shifting-type motorcycle during riding.

BRIEF DESCRIPTION OF THE DRAWINGS

FIG. 3B is a schematic view of the second embodiment of the electronic shift unit of the present invention.

FIG. 9A is a schematic diagram of the first calculation mode of the vehicle controller of the present invention.

DETAILED DESCRIPTION OF THE INVENTION

Figure 1:
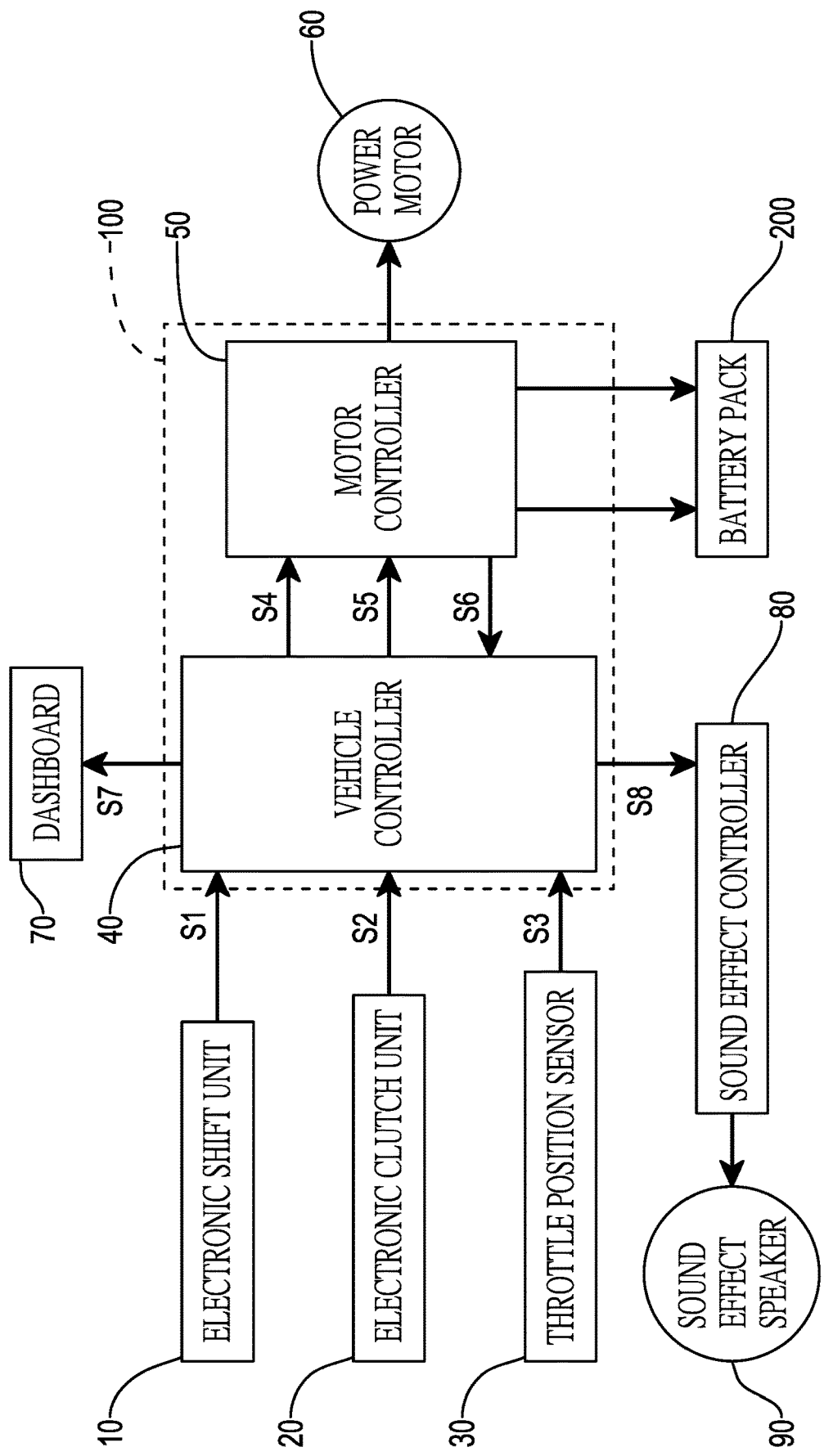
FIG. 1 is a circuit block diagram of the first embodiment of the electronic gear-shifting system with sound effects and display of the present invention.

In order to understand the technical characteristics and practical effects of the prevent invention in detail, and accomplish them according to the content of the invention, the detailed description is as follows with the embodiment shown in the figure:

The present invention is an electronic gear-shifting system with sound effects and display, which is mainly applied to an electric motorcycle, such that the electric motorcycle has all functions like a gear-shifting-type motorcycle. Referring to FIG. 1, the present invention mainly includes an electronic shift unit 10, an electronic clutch unit 20, a throttle position sensor (TPS) 30, a vehicle controller 40, a motor controller 50, a power motor 60, a dashboard 70, a sound effect controller 80, and a control unit 100. Wherein, the control unit 100 includes the vehicle controller 40 and the motor controller 50.

Figure 2:
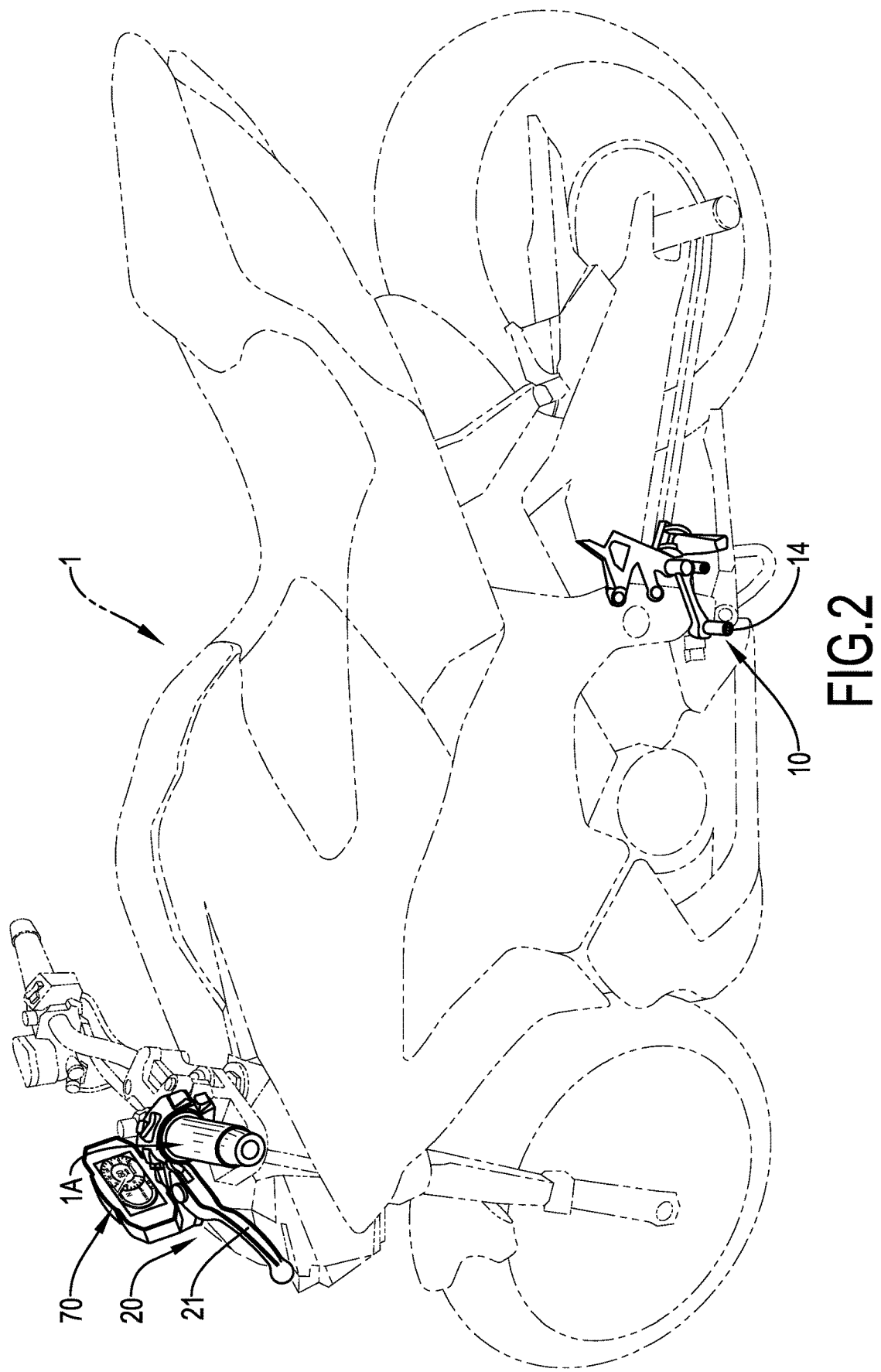
FIG. 2 is a schematic view of the electronic gear-shifting system with sound effects and display of the present invention mounted on an electric motorcycle.

The electronic shift unit 10 is mounted on an electric motorcycle 1 (as shown in FIG. 2), and a user can switch the gear position of the electric motorcycle 1 through the electronic shift unit 10 according to the power required for riding, so as to generate a gear shifting signal S1. The gear shifting signal S1 may be an upshift signal, a downshift signal, or a neutral signal; the gears can be shifted in the way of cyclic gears (neutral↔1st gear↔2nd gear↔3rd gear), or in accordance with international gears (1st gear↔neutral↔2nd gear↔3rd gear). Wherein, the number of gears and the way of cyclic change are formulated with reference to the operation mode of the current common gear-shifting-type motorcycle, and it is not limited to this. In the following, the gear conversion is based on the international gears and the highest gear is the 3rd gear.

Figure 3A:
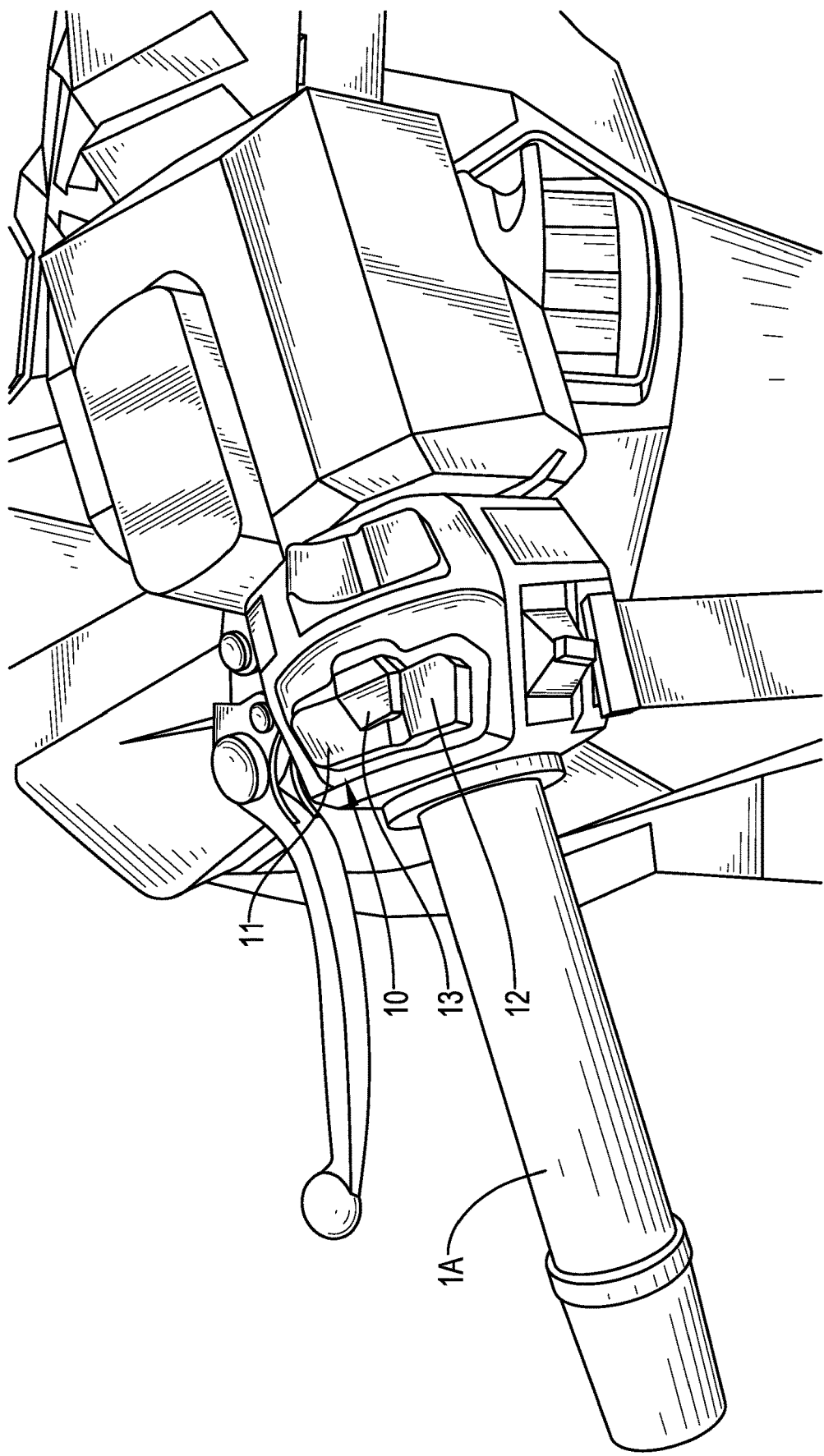
FIG. 3A is a schematic view of the first embodiment of the electronic shift unit of the present invention.

As shown in FIG. 3A, the first embodiment of the electronic shift unit 10 is composed of a plurality of buttons, including an upshift button 11, a downshift button 12, and a neutral button 13. The buttons can be mounted on the position of the electric motorcycle 1 that is convenient for the user to operate and press, for example, near one of the handles 1A of the electric motorcycle 1. When the upshift button 11, the downshift button 12, and the neutral button 13 are pressed and triggered by the user, correspondingly an upshift signal, a downshift signal, and a neutral signal are generated.

As shown in FIG. 3B, the second embodiment of the electronic shift unit 10 includes a gear shift pedal 14 and a gear shift pedal position sensor 15. The gear shift pedal 14 is for the user to pedal down. The working principle of the gear shift pedal position sensor 15 is similar to a multi-segment switch. As the user presses the gear shift pedal 14 each time, the state of contacts inside the gear shift pedal position sensor 15 is changed through the gear shift pedal 14 being hooked or pedaled down, thereby generating the gear shifting signal S1. For example, the user hooks the gear shift pedal 14 to output the upshift signal, and pedals down the gear shift pedal 14 to output the downshift signal.

Figure 4:
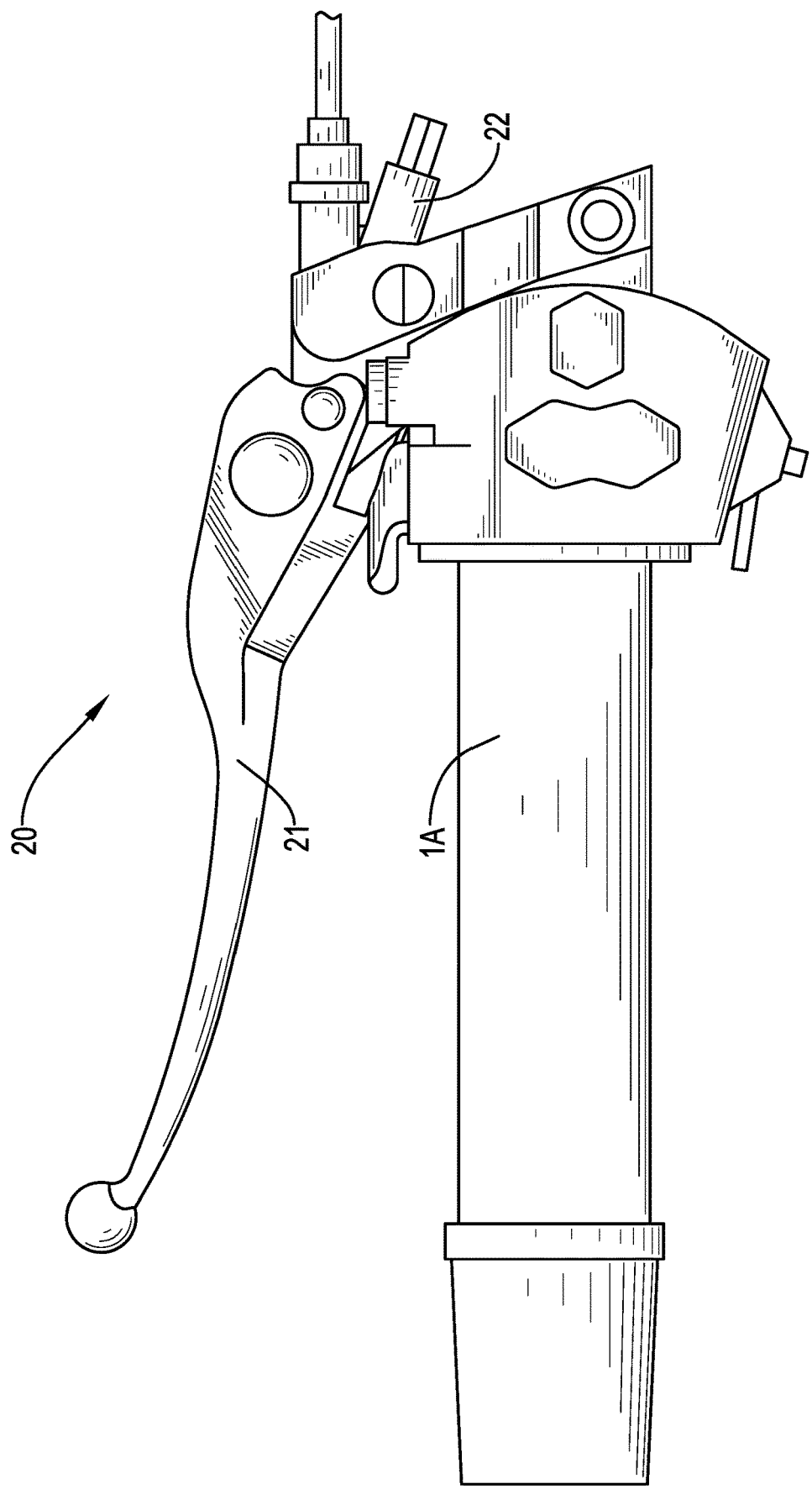
FIG. 4 is a schematic view of the electronic clutch unit of the present invention.

Referring to FIGS. 4, the electronic clutch unit 20 is mounted on the electric motorcycle 1, for the user to operate to generate a clutch signal S2. In a preferred embodiment, the electronic clutch unit 20 includes a clutch lever 21 and a micro switch 22. The clutch lever 21 is mounted near the handle 1A of the electric motorcycle 1 for the user to operate as holding and releasing. The micro switch 22 is connected to the clutch lever 21 and outputs the clutch signal S2 according to the state of the clutch lever 21. For example, when the clutch lever 21 is pulled, the micro switch 22 is triggered to output a high-level clutch signal S2; on the contrary, when the clutch lever 21 is not pulled, the micro switch 22 is not triggered, and does not output the clutch signal S2. In another preferred embodiment, the micro switch 22 in the electronic clutch unit 20 is replaced by a lever position sensor. The lever position sensor detects the pulling state of the clutch lever 21 and generates a clutch signal S2 of 0-5 volts.

The throttle position sensor 30 is connected to a throttle of the electric motorcycle 1. When the throttle is rotated, the throttle position sensor 30 detects the position of the throttle to generate a throttle position signal S3. The throttle position signal S3 reflects the torque required by the user.

The vehicle controller 40 is connected to the electronic shift unit 10, the electronic clutch unit 20, and the throttle position sensor 30, receives the shift signal S1, the clutch signal S2, and the throttle position signal S3. The vehicle controller 40 generates a motor torque command S4 according to the aforementioned signals. For example, the vehicle controller 40 receives the shift signal S1 and the clutch signal S2 within a preset time, which indicates that the rider intends to shift gears to switch the gear of the electric motorcycle to a target gear position. When the vehicle controller 40 switches to the target gear position, the vehicle controller 40 generates and outputs the motor torque command S4 according to the target gear position. The generation method of the motor torque command S4 will be described in detail later. In addition to the motor torque command S4, in a preferred embodiment, the vehicle controller 40 outputs a recharging current command S5 according to the target gear position and the throttle position signal S3.

The motor controller 50 is connected to the vehicle controller 40, and receives the motor torque command S4 and the recharging current command S5 outputted by the vehicle controller 40. The motor controller 50 controls the power motor 60 to rotate according to the motor torque command S4. A rotational speed sensor may be mounted on the power motor 60 for sensing a real speed TR of the power motor 60 and providing the sensing result to the motor controller 50, so that the motor controller 50 generates a motor real speed signal S6 according to the real speed TR, and provides the motor real speed signal S6 to the vehicle controller 40, so that the vehicle controller 40 obtains a vehicle speed of the electric motorcycle 1; the motor controller 50 receives the recharging current command S5 and outputs a recharging current according to the recharging current command S5 to charge a battery pack 200 of the electric motorcycle 1.

Figure 5:
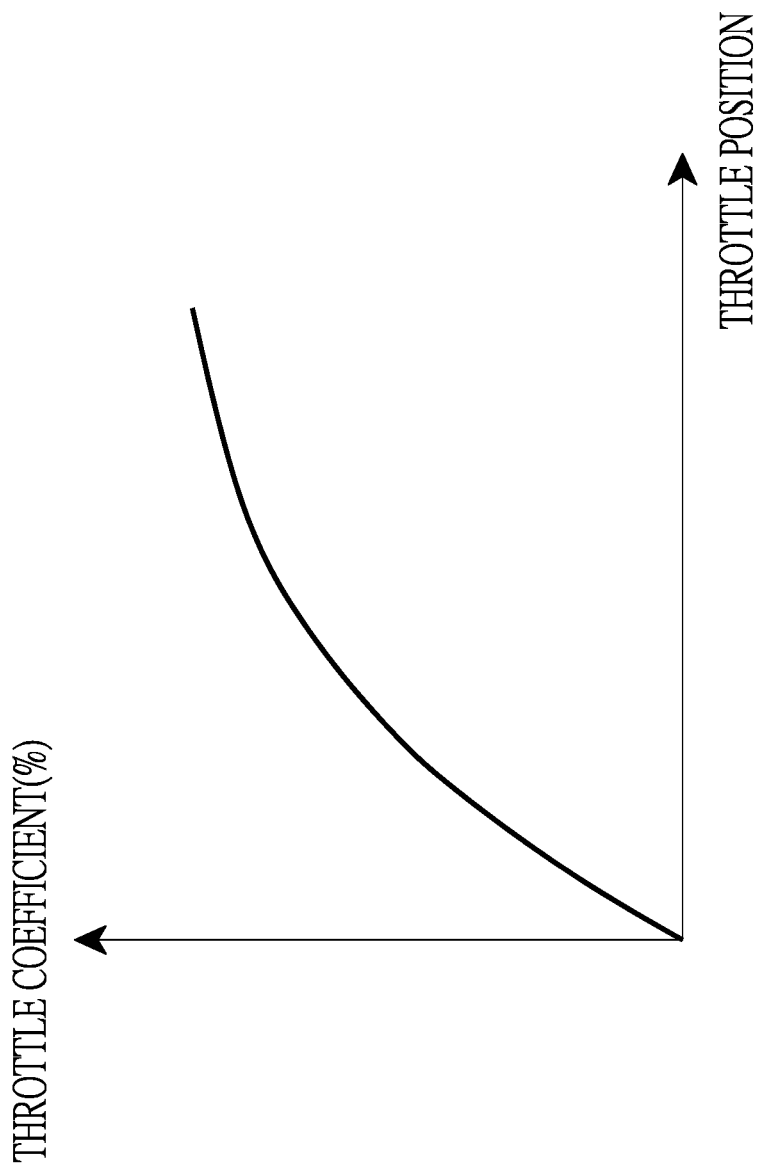
FIG. 5 is a schematic curve diagram of the relative relationship between the throttle coefficient and the throttle position.

Referring to FIG. 5, the vehicle controller 40 has a built-in relative relationship between the throttle coefficient and the throttle position, searching for a corresponding throttle coefficient (%) according to the magnitude of the throttle position signal S3. The throttle coefficient is positively related to the throttle position. When the throttle position is larger, the throttle coefficient is also larger, representing the rider expects the power motor 60 to have a greater torque output when operating the throttle.

Figure 6:
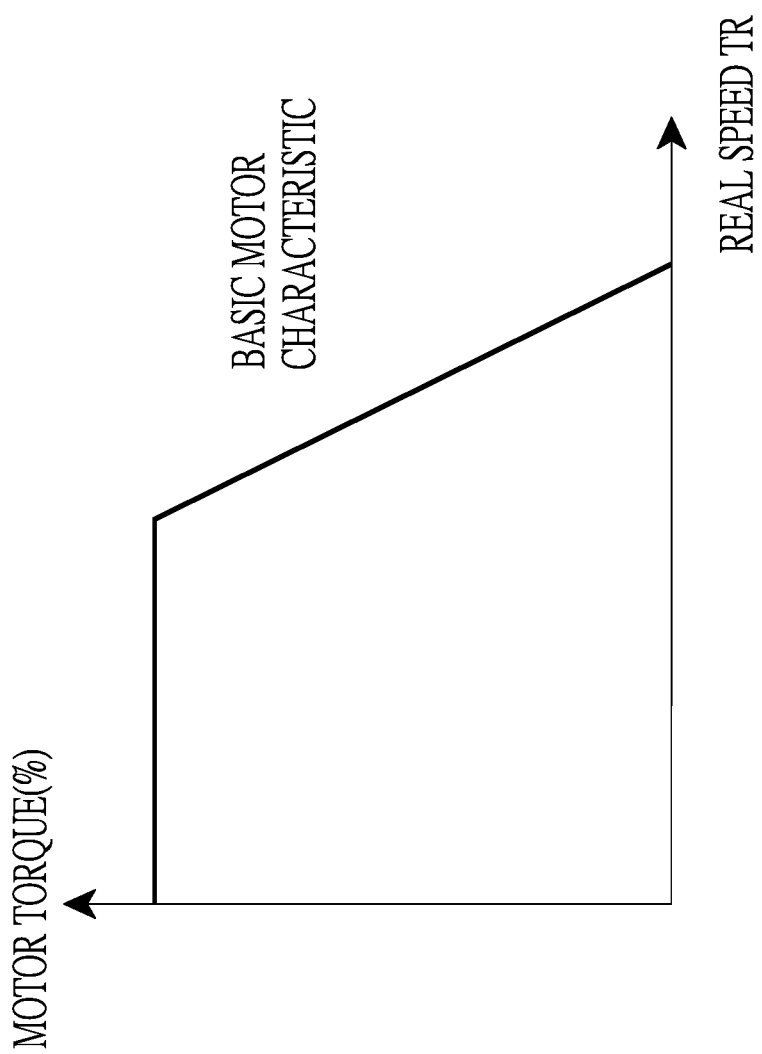
FIG. 6 is a schematic curve diagram of the basic relationship between the torque value and the real speed of the power motor.
Figure 7:
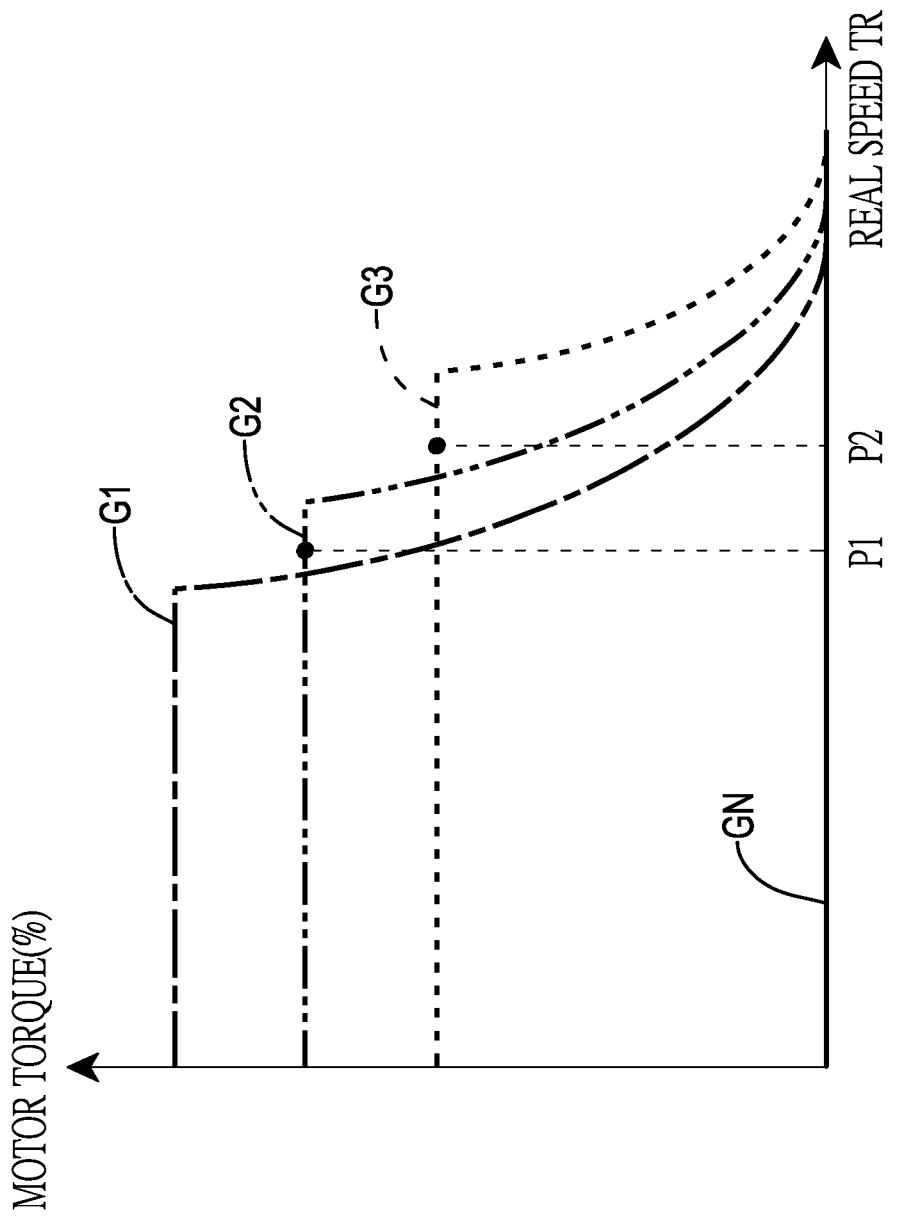
FIG. 7 is a schematic curve diagrams of the relationships between the motor torque and the real speed that are respectively preset according to different gear positions of the present invention.

Regarding the generation method of the motor torque command S4, it is obtained by the computation of a built-in determination program by the vehicle controller 40. Referring to FIG. 6, it is the basic relative relationship between the motor torque (vertical axis) and the real speed (horizontal axis) of the power motor 60. The present invention regards the basic relationship as a reference basis to establish characteristic curves representing the relationship between the motor torque and the real speed for different gear positions. As shown in FIG. 7, four different motor characteristic curves of the power motor 60 in 1st gear, 2nd gear, 3rd gear and neutral (i.e., N gear) are represented by G1, G2, G3 and GN respectively. Wherein, the motor torque value in the N gear is always maintained at 0. The low gear position (such as the 1st gear shown by the curve G1) has a higher motor torque value when the real speed TR is lower, but the maximum value of the real speed TR is lower at the low gear position. On the contrary, the high gear position (such as the 3rd gear shown by the curve G3) has a lower motor torque value when the real speed TR is lower, but the maximum value of the real speed TR is higher at the high gear position. In this way, the power output of the gearbox in different gear positions is simulated, and the vehicle controller 40 uses the corresponding relationship curve by a lookup table searching according to the current gear position of the electric motorcycle 1.

In an embodiment, the vehicle controller 40 sets the motor torque command S4 according to the product of the motor torque value and the throttle coefficient, and the calculation formula is as follows:

Motor torque command $S4$=motor torque value× throttle coefficient

Wherein, the vehicle controller 40 selects the relationship curve of the corresponding gear position from FIG. 7 according to the current gear position of the electric motorcycle 1 to obtain the motor torque value, and in conjunction to search the throttle coefficient (%) in FIG. 6, to calculate the motor torque command S4. For example, when the motor torque value is 80% and the throttle coefficient is 80%, the vehicle controller 40 computes the motor torque command as 64%, and provides the motor torque command S4 to the motor controller 50.

Referring to FIG. 7, when it is desired to make the electric motorcycle 1 go up from 1st gear to 2nd gear, using the curve G1 to explain, because the torque vale of 1st gear will gradually decrease non-linearly with the increase of the real speed TR, when the torque value of 1st gear is equal to the torque value of 2nd gear, the upshift can be performed. But because of the characteristics of the gearbox, when the electric motorcycle 1 is upshifted, the real speed TR of the power motor 60 will decrease, therefore the better timing for upshifting is when the torque value of 1st gear is slightly lower than the torque value of 2nd gear, the real speed TR corresponding to the timing is a suggested upshift speed P1 form 1st gear to 2nd gear. Similarly, when it is desired to make the electric motorcycle 1 go up from current 2nd gear to 3rd gear, it also correspondingly has a suggested upshift speed P2. By increasing the torque of the gear position, the present invention increases the maximum power output of the gear position, enhances the sense of acceleration when the gear position is switched.

Figure 8:
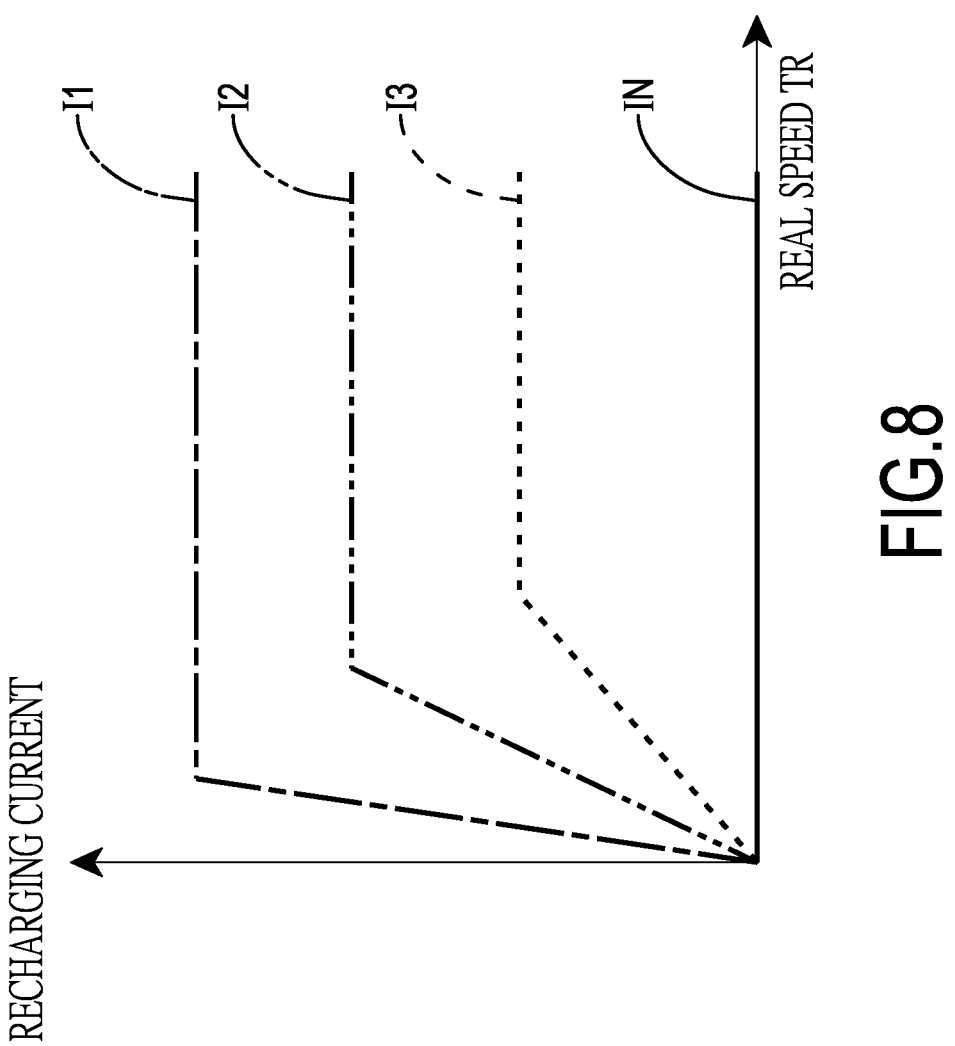
FIG. 8 is a schematic diagram of the relationship between the real speed and the recharging current that is preset according to different gear positions of the present invention.

The vehicle controller 40 can also perform different recharging current planning according to different gear positions. Referring to FIG. 8, respectively represent four different recharge current curves for 1st gear, 2nd gear, 3rd gear and neutral (N gear) by I1, I2, I3 and IN. Under the condition of the same motor speed, the present invention sets the relatively large recharging current for the low gear positions and the relatively small recharging current for the high gear positions. Therefore, when the vehicle controller 40 determines that the throttle is fully closed according to the throttle position signal S3 (i.e., the throttle position is 0%), the vehicle controller 40 selects a recharging current curve corresponding to the current gear position and sends a recharging current command S5 to the motor controller 50. The motor controller 50 outputs a recharging current to the battery pack 200 according to the recharging current command S5. As there is a larger recharging current in low gear positions, this can simulate the effect of the gearbox of the common gear-shifting-type motorcycle with a higher transmission braking effect in the low gear positions.

When the vehicle controller 40 determines that the current gear position is N gear or the electronic clutch unit 20 outputs the clutch signal S2 (i.e., the clutch lever 21 is pulled), the vehicle controller 40 not only controls the output of motor torque to be zero, but also outputs the recharging current command S5 to the motor controller 50 to control the motor controller 50 to output a zero or extremely low value of the recharging current to the battery pack 200, thereby simulating the situation that only the rear wheels slide after the power of the common gear-shifting-type motorcycle is cut off.

The vehicle controller 40 in the present invention computes a virtual speed VR according to the real speed TR of the power motor 60 to control the dashboard 70 and the sound effect controller 80 to generate corresponding outputs according to the virtual speed VR. Wherein, the vehicle controller is built with a first calculation mode 41 and a second calculation mode 42. The first calculation mode 41 is configured to calculate the virtual speed VR in the condition that the electric motorcycle 1 is in neutral and the clutch lever 21 is not pulled, and the virtual speed VR is corresponding to the real speed TR of the power motor 60. The second calculation mode 42 is configured to calculate the virtual speed VR in the condition that the electric motorcycle 1 is in the neutral and the clutch lever 21 is pulled, and the description of each calculation mode is as follows.

The first calculation mode 41: As shown in the FIG. 9A, different speed ratios (real speed TR/virtual speed VR) are preset for different gear positions correspondingly. When the vehicle controller 40 receives the motor real speed signal S6, it computes the corresponding virtual speed VR through a speed ratio of each gear position. For example, the speed ratio of 2nd gear is 0.5, and the current real speed TR of the power motor 60 is 600 (rpm), the vehicle controller computes to obtain that the virtual speed VR is 1200 (rpm).

Figure 9B:
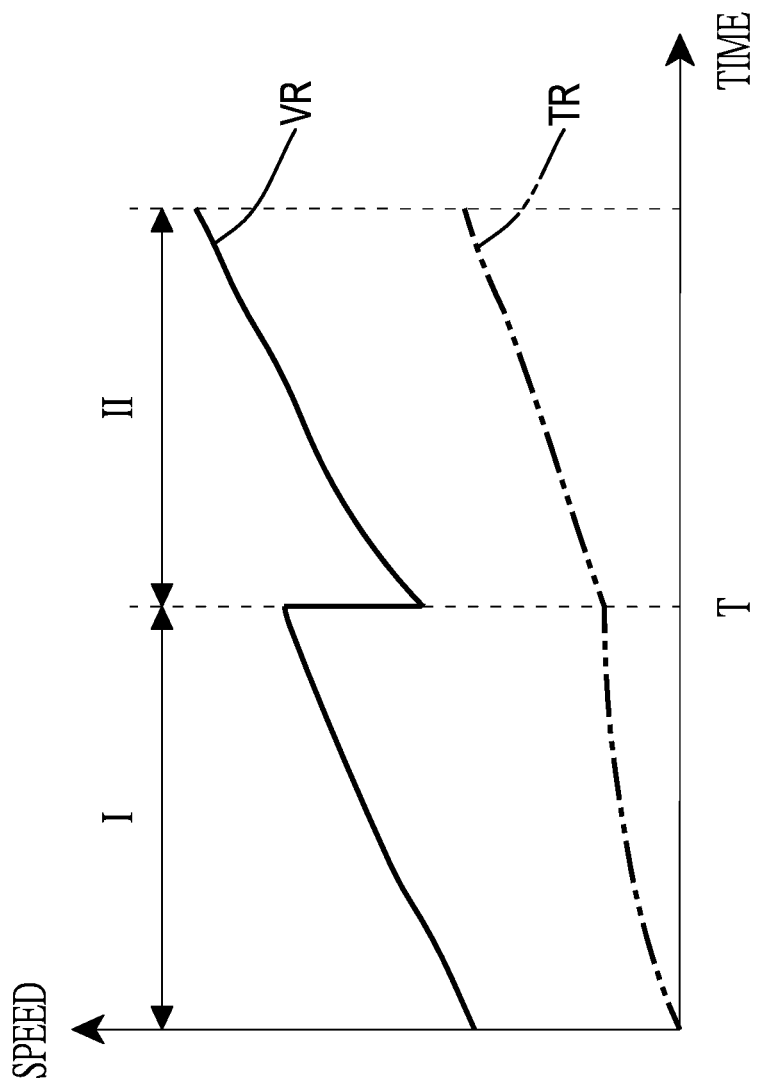
FIG. 9B is a schematic diagram of the relationship curves between the real speed and the virtual speed and time in the first calculation mode.

FIG. 9B shows characteristic curves of time (horizontal axis) and the speed (vertical axis) of the power motor 60 in different gear positions in the first calculation mode 41. In the first period I before the time point T, it means that the current gear position of the electric motorcycle 1 is 1st gear, and the real speed TR of the power motor 60 starts from 0 and increases with time, and the vehicle controller 40 generates the virtual speed VR of 1st gear according to the speed ratio of 1st gear. The time point T represents the gear-shifting timing of the electric motorcycle 1. In the second period II after the time point T, it means that the current gear position of the electric motorcycle 1 is 2nd gear, and the vehicle controller 40 generates the virtual speed VR of 2nd gear according to the speed ratio of 2nd gear. As the speed ratio of 1st gear and 2nd gear are different, the change of the virtual speeds VR between the two gear positions has a jump. The electric motorcycle 1 simulates speed changes for shifting gear positions of a gearbox through the jump to generate different virtual speeds VR, and the virtual speed VR decreases when upshifting.

Figure 10A:
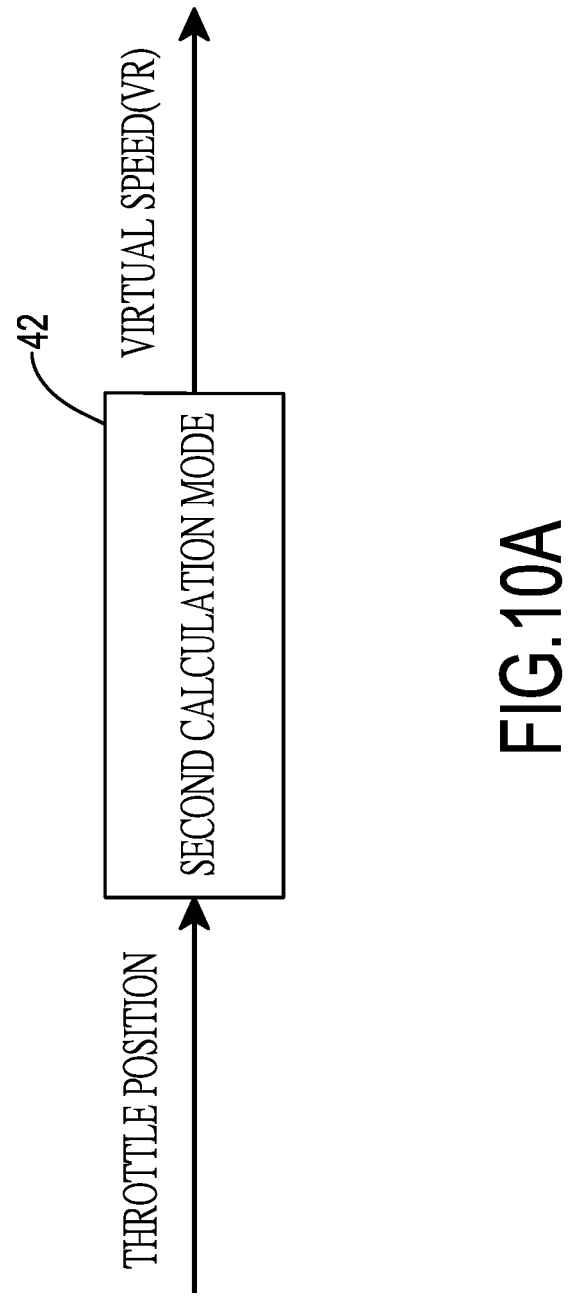
FIG. 10A is a schematic diagram of the second calculation mode of the vehicle controller of the present invention.

The second calculation mode 42: Referring to FIG. 10A, the virtual speed VR has no corresponding relationship with the real speed TR in this situation. The vehicle controller 40 computes to obtain the virtual speed VR according to a power equation, and the power equation is as follows:

$$J\dot{\omega} + B\omega = T$$

Wherein, the parameters are J as inertia, ω as speed, B as resistance constant, and T as torque. The inertia J and the resistance constant B are fixed constant in the condition of neutral and when the clutch lever 21 is pulled, therefore the speed ω can be calculated through the torque T. Wherein, the torque T can be obtained by calculating according to the throttle position signal S3, and the final speed ω obtained is the virtual speed VR calculated in the second calculation mode.

Figure 10B:
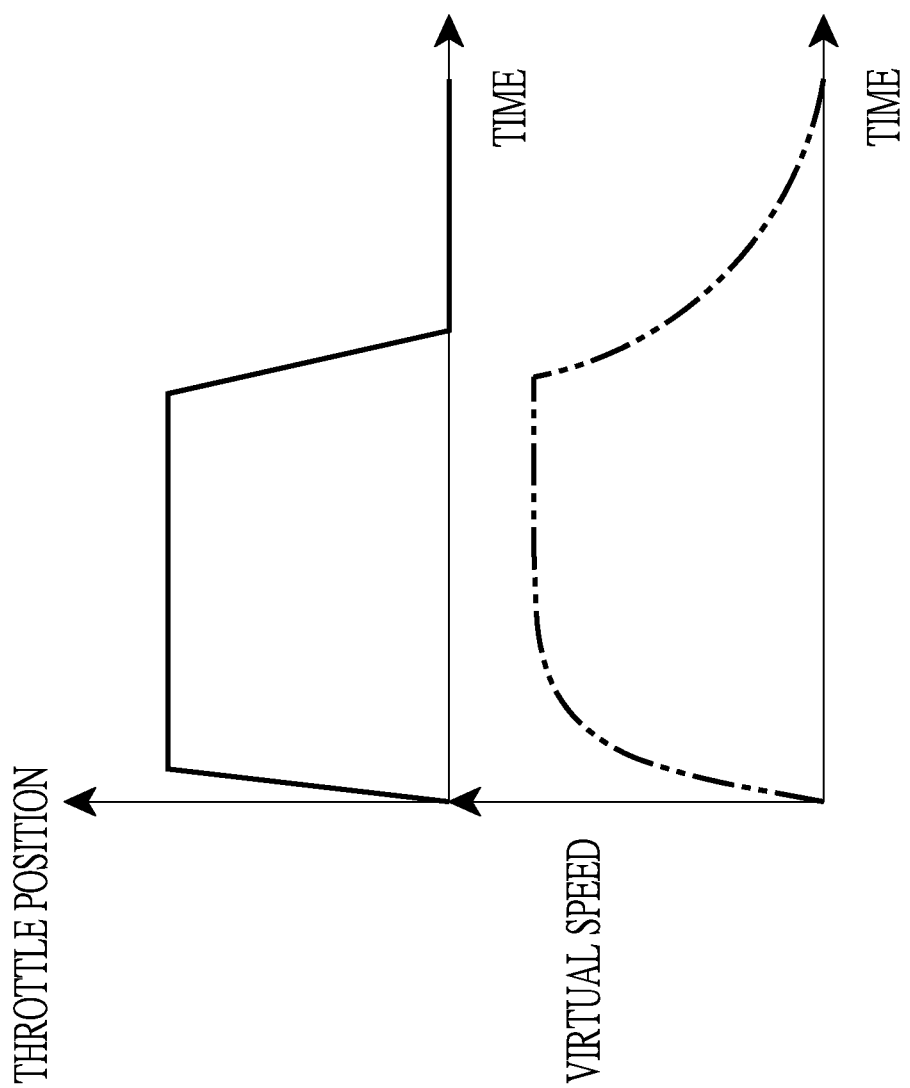
FIG. 10B is a schematic diagram of the relationship curves between the throttle position and the virtual speed and time in the second calculation mode.

Referring to FIG. 10B, which shows characteristic curves of the magnitude of throttle position (vertical axis) and the virtual speed VR (vertical axis) changing with time (horizontal axis) in the second calculation mode 42. When the throttle is opened and increase continuously (twist throttle), the throttle position rises linearly, and the virtual speed VR rises non-linearly with it. When the throttle is slowly released until loose (release throttle), the throttle position decreases linearly to 0, and the virtual speed VR gradually and non-linearly decreases to stop due to inertia.

The above terms "first" and "second" are configured to describe each calculation mode, but should not be limiting, and these terms are only configured to distinguish one calculation mode from another calculation mode.

The vehicle controller 40 computes the virtual speed VR of the electric motorcycle 1 through the above-mentioned first calculation mode 41 or the second calculation mode 42, and generating and outputting a dashboard control command S7 to the dashboard 70 according to the virtual speed VR, the gear shifting signal S1 and the vehicle speed.

Figure 11:
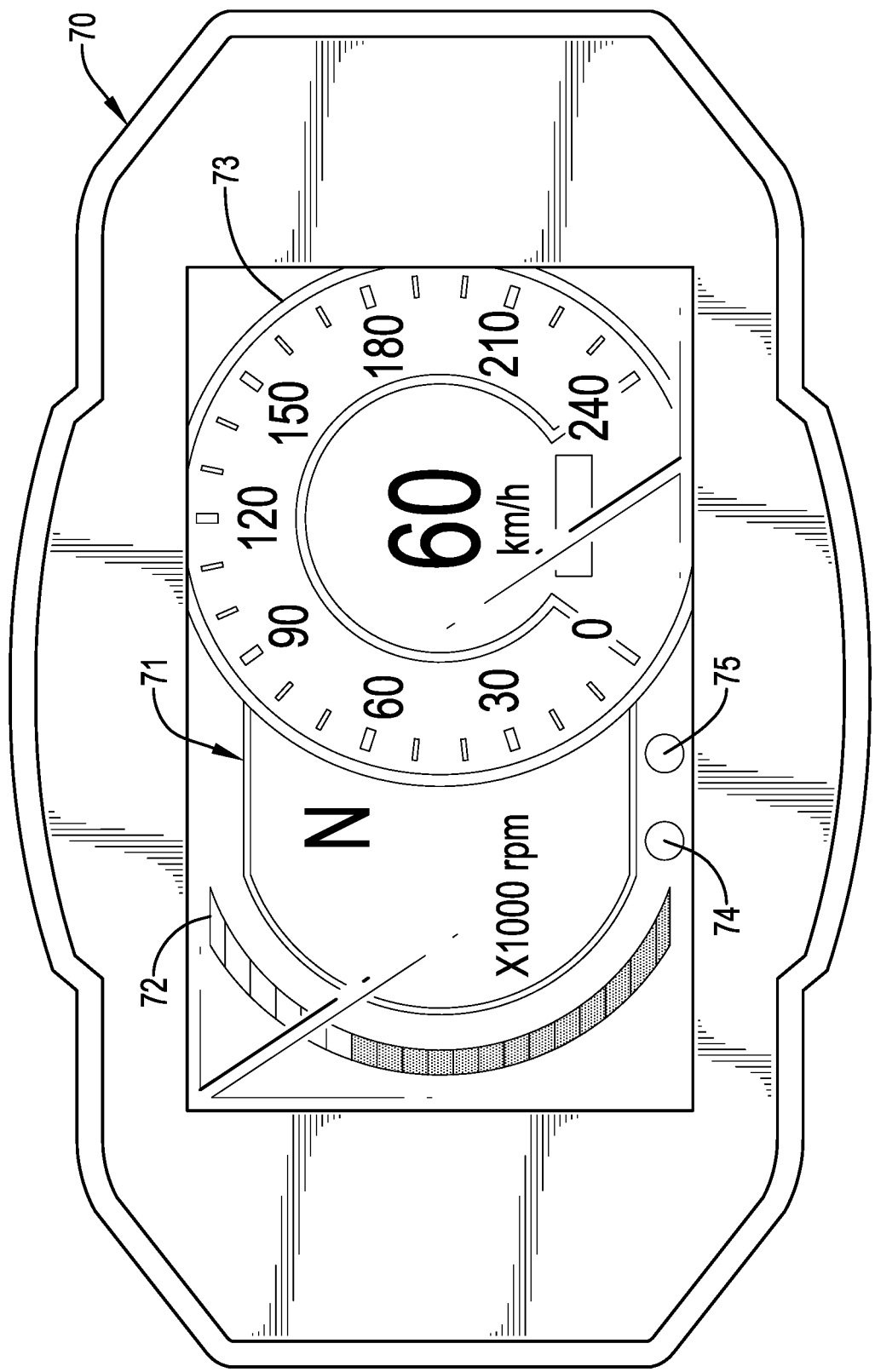
FIG. 11 is a schematic diagram of the dashboard of the electronic gear-shifting system with sound effects and display of the present invention.

The dashboard 70 is mounted on an electric motorcycle 1 (as shown in FIG. 2) and connected to the vehicle controller 40. The dashboard 70 receives the dashboard control command S7 outputted by the vehicle controller 40. Referring to FIG. 11, the display content of the dashboard 70 mainly includes a gear display area 71, a speed area 72 and a vehicle speed 73; the gear display area 71 is configured to display the target gear position of the electric motorcycle 1, and the speed area 72 is configured to display the virtual speed VR of the electric motorcycle 1, and the interface of the vehicle speed area 73 is configured to display the vehicle speed of the electric motorcycle 1.

The display content of the dashboard 70 may further include a suggested upshift prompt light 74 and a restricted downshift prompt light 75. When the vehicle controller 40 determines that the real speed TR of the power motor 60 reaches the suggested upshift speed of each gear position, the vehicle controller 40 will control the dashboard 70 to display the suggested upshift prompt light 74. The suggested upshift prompt lights will prompt the user to perform upshift, so that the electric motorcycle 1 obtains a higher power outputs to avoid that the real speed TR increases but the power of the electric motorcycle 1 does not increase accordingly.

When the vehicle controller 40 determines that the real speed TR of the power motor 60 is still higher than a restricted downshift speed of each gear position, and when the electronic shift units 10 is operated to perform downshift, the vehicle controller 40 will control the dashboard 70 to display the restricted downshift prompt light 75. The restricted downshift prompt light 75 will prompt that the user is unable to perform downshift, and the vehicle controller 40 will restrict the electronic shift unit 10 to be operated until the real speed TR is lower than the restricted downshift speed. Wherein, because of characteristics of the gearbox, when the electric motorcycle 1 is downshifted, the real speed TR of the power motor will increase, and the power motor 60 has a chance to burn out. Therefore, the vehicle controller 40 is preset with the restricted downshift speed for determining whether the electric motorcycle 1 is able to perform downshift.

In addition, the vehicle controller 40 generates and outputs a sound effect control command S8 to the sound effect controller 80 according to the gear shifting signal S1, the throttle position signal S3 and the virtual speed VR.

Figure 12:
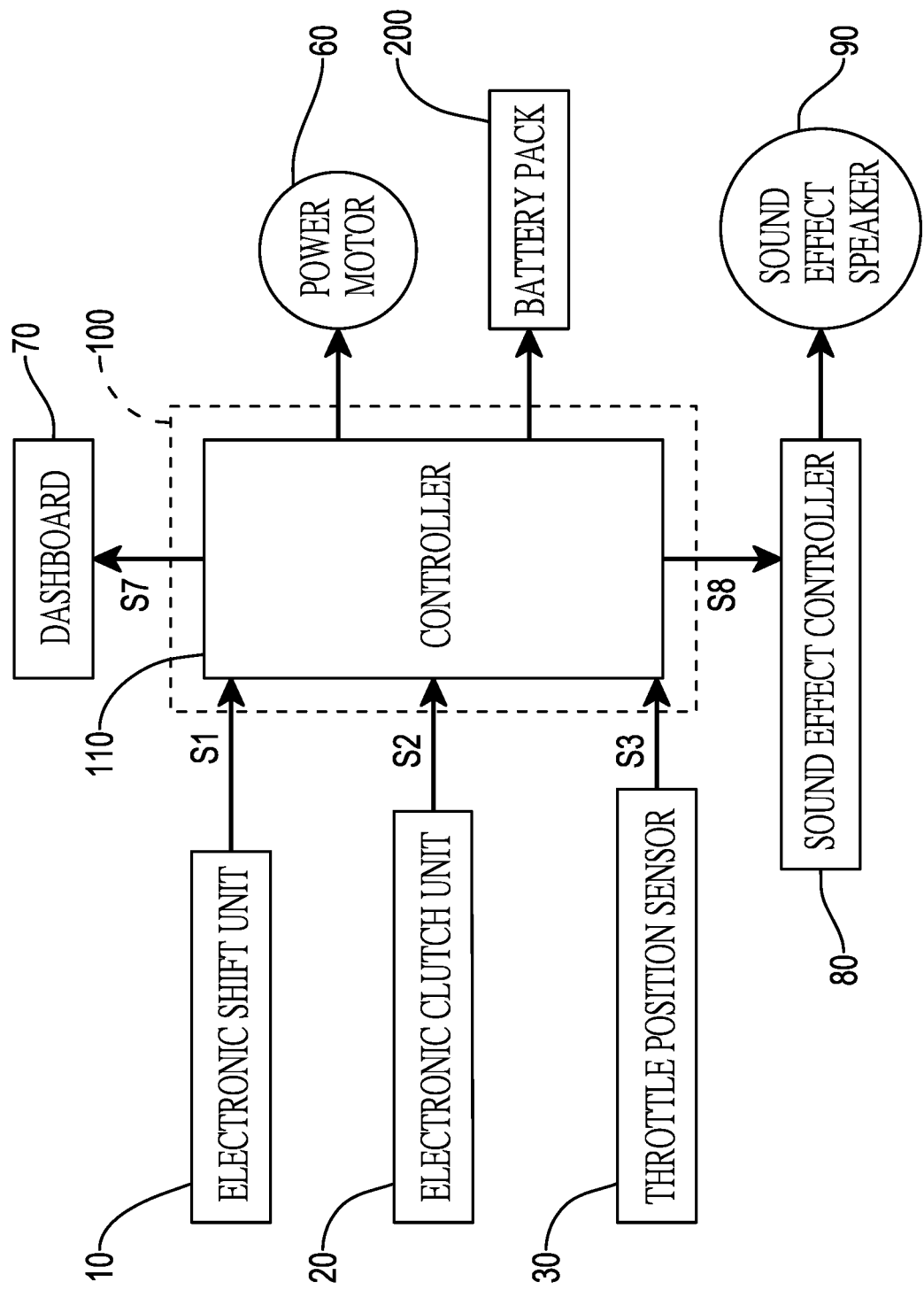
FIG. 12 is a circuit block diagram of the second embodiment of the electronic gear-shifting system with sound effects and display of the present invention.

The sound effect controller 80 is connected to the vehicle controller 40 and receives the sound effect control command S8 outputted by the vehicle controller 40. The sound effect controller 80 generates a sound source signal to a sound effect speaker 90 according to the sound effect control command S8, outputting the sound source signal through the sound effect speaker 90. Wherein, when the virtual speed VR received by the sound effect controller 80 is higher, the volume output by the sound effect speaker 90 is louder and the sound frequency is higher; the virtual speed VR is lower, and the volume output by the sound effect speaker 90 is smaller and the sound frequency is lower. Referring to FIG. 12, it is a circuit block diagram of a second embodiment of an electronic gear-shifting device of an electric motorcycle for simulating gear shifting power output of the present invention. The difference from the first embodiment of FIG. 1 is that the control unit includes a controller 110. The controller 110 integrates the above-mentioned vehicle controller 40 and the motor controller 50 and performs the functions of the vehicle controller and the motor controller 50 described above.

Under the condition that gear-shifting mechanisms such as a clutch, a gearbox, and so on are not additionally added, the present invention equips an electric motorcycle with an electronic shift unit and an electronic clutch unit for the rider to perform shifting operations and presets motor characteristic curves of different gear positions. Therefore, the power motor of the electric motorcycle generates different torque outputs according to the corresponding motor characteristic curve in different gear positions, and simulates the power output of the gear-shifting-type motorcycle when switching gears. The electric motorcycle converts the real speed of the power motor into a virtual speed through an algorithm, so that a dashboard and a sound effect controller of the electric motorcycle have different outputs according to the different virtual speeds, creating a visual and auditory effect of the gear-shifting-type motorcycle. In addition, the present invention plans different recharging currents for each different gear position, so that the low gear positions have higher recharging currents, simulating the function of a mechanical gearbox transmission brake. The present invention controls the motor to be in a low-current regenerative recharging mode in the neutral gear or when the clutch is disengaged, thereby simulating the power cut off of the vehicle and the effect of sliding without resistance.

The above only records the implementations or embodiments of the technical artifices adopted by the present invention to solve the problems, and is not configured to limit the claims of the present invention. That is, all equivalent changes and modifications that are consistent with the meaning of the claims of the present invention or made in accordance with the claims of the present invention are covered by the claims of the present invention.

What is claimed is:

1. An electronic gear-shifting system with sound effects and display, adapted to be mounted on an electric motorcycle, and including:
   an electronic shift unit outputting a shift signal;
   an electronic clutch unit outputting a clutch signal;
   a throttle position sensor outputting a throttle position signal;
   a control unit connected to the electronic shift unit, the electronic clutch unit, and the throttle position sensor; and the control unit determining whether the electric motorcycle is switched to a target gear position according to the shift signal, the clutch signal, and throttle position signal to control a power motor of the electric motorcycle;
   a sound effect controller connected to the control unit; and
   a dashboard connected to the control unit and receiving communication data transmitted by the control unit; and the dashboard configured to display the target gear position, a virtual speed and a vehicle speed;
   wherein the control unit further includes:
   a vehicle controller connected to the electronic shift unit, the electronic clutch unit, and the throttle position sensor; the vehicle controller determining whether the electric motorcycle is switched to the target gear position according to the shift signal, the clutch signal, and throttle position signal, and generating a motor torque command corresponding to the target gear position; and
   a motor controller connected to the vehicle controller to receive the motor torque command, and controlling the power motor of the electric motorcycle according to the motor torque command;
   wherein the vehicle controller is preset with recharging current curves corresponding to different gear positions, and the recharging current curves include relationships between magnitudes of recharging currents and real speeds, and the recharging current in a low gear position is greater than the recharging current in a high gear position;
   when the vehicle controller determines that a throttle position of the electric motorcycle is fully closed according to the throttle position signal, the vehicle controller outputs a recharging current command to the motor controller according to the recharging current curve corresponding to the gear position of the electric motorcycle, such that the motor controller outputs a recharging current to a battery pack.

2. The electronic gear-shifting system with sound effects and display as claimed in claim 1, wherein the electronic shift unit includes an upshift button, a downshift button, and a neutral button that are mounted on the electric motorcycle; and the shift signal is generated when any one of the upshift button, the downshift button, and the neutral button is triggered.

3. The electronic gear-shifting system with sound effects and display as claimed in claim 1, wherein the electronic shift unit includes a gear shift pedal and a gear shift pedal position sensor, and wherein the gear shift pedal position sensor is connected to the gear shift pedal; and the shift signal is generated when the gear shift pedal is hooked or pedaled down.

4. The electronic gear-shifting system with sound effects and display as claimed in claim 1, wherein the electronic clutch unit includes a clutch lever and a micro switch, and the micro switch is connected to the clutch lever to output the clutch signal according to a state of the clutch lever.

5. The electronic gear-shifting system with sound effects and display as claimed in claim 1, wherein the electronic clutch unit includes a clutch lever and a lever position sensor, and the lever position sensor is connected to the clutch lever to output the clutch signal according to a state of the clutch lever.

6. The electronic gear-shifting system with sound effects and display as claimed in claim 2, wherein the vehicle controller is preset with motor characteristic curves corresponding to different gear positions, and the motor characteristic curves include relationships between motor torque values and real speeds; wherein
   the motor torque value corresponds to a neutral is zero;
   the motor torque value is higher and a maximum value of the real speed is lower when in a low gear position and at a low speed; and
   the motor torque value is lower and the maximum value of the real speed is higher when in a high gear position and at a low speed.

7. The electronic gear-shifting system with sound effects and display as claimed in claim 1, wherein the control unit computes the virtual speed according to a real speed of the power motor and controls the dashboard and the sound effect controller according to the virtual speed to generate corresponding outputs.

8. The electronic gear-shifting system with sound effects and display as claimed in claim 7, wherein a first calculation mode and a second calculation mode are built in the control unit, and the first calculation mode is configured to calculate the virtual speed in the condition that the electric motorcycle is in neutral and the electronic clutch unit is not triggered; and the second calculation mode is configured to calculate the virtual speed in the condition that the electric motorcycle is in the neutral or the electronic clutch unit is triggered.

9. The electronic gear-shifting system with sound effects and display as claimed in claim 1, wherein the control unit controls the dashboard to display a suggested upshift prompt light when the control unit determines the real speed of the power motor reaches a suggested upshift speed of each gear position.

10. The electronic gear-shifting system with sound effects and display as claimed in claim 1, wherein the control unit controls the dashboard to display a restricted downshift prompt light when the control unit determines that the real speed of the power motor is still higher than a restricted downshift speed of each gear position and the electronic shift units is operated to perform downshift; and the control unit restricts the electronic shift unit to be operated until the real speed is lower than the restricted downshift speed.

11. An electronic gear-shifting system with sound effects and display, adapted to be mounted on an electric motorcycle, and including:
an electronic shift unit outputting a shift signal;
an electronic clutch unit outputting a clutch signal;
a throttle position sensor outputting a throttle position signal;
a control unit connected to the electronic shift unit, the electronic clutch unit, and the throttle position sensor; and the control unit determining whether the electric motorcycle is switched to a target gear position according to the shift signal, the clutch signal, and throttle position signal to control a power motor of the electric motorcycle;
a dashboard connected to the control unit; and
a sound effect controller connected to the control unit and receiving communication data transmitted by the control unit; and the sound effect controller generating a sound source signal according to the throttle position signal, the target gear position and a virtual speed, and transmitting the sound source signal to a sound effect speaker;
wherein the control unit further includes:
a vehicle controller connected to the electronic shift unit, the electronic clutch unit, and the throttle position sensor; the vehicle controller determining whether the electric motorcycle is switched to the target gear position according to the shift signal, the clutch signal, and throttle position signal, and generating a motor torque command corresponding to the target gear position; and
a motor controller connected to the vehicle controller to receive the motor torque command, and controlling the power motor of the electric motorcycle according to the motor torque command;
wherein the vehicle controller is preset with recharging current curves corresponding to different gear positions, and the recharging current curves include relationships between magnitude of recharging currents and real speeds, and the recharging current in a low gear position is greater than the recharging current in a high gear position;
when the vehicle controller determines that a throttle position of the electric motorcycle is fully closed according to the throttle position signal, the vehicle controller outputs a recharging current command to the motor controller according to the recharging current curve corresponding to the gear position of the electric motorcycle, such that the motor controller outputs a recharging current to a battery pack.

12. The electronic gear-shifting system with sound effects and display as claimed in claim 11, wherein the electronic shift unit includes an upshift button, a downshift button, and a neutral button that are mounted on the electric motorcycle; and the shift signal is generated when any one of the upshift button, the downshift button, and the neutral button is triggered.

13. The electronic gear-shifting system with sound effects and display as claimed in claim 11, wherein the electronic shift unit includes a gear shift pedal and a gear shift pedal position sensor, and wherein the gear shift pedal position sensor is connected to the gear shift pedal; and the shift signal is generated when the gear shift pedal is hooked or pedaled down.

14. The electronic gear-shifting system with sound effects and display as claimed in claim 11, wherein the electronic clutch unit includes a clutch lever and a micro switch, and the micro switch is connected to the clutch lever to output the clutch signal according to a state of the clutch lever.

15. The electronic gear-shifting system with sound effects and display as claimed in claim 11, wherein the electronic clutch unit includes a clutch lever and a lever position sensor, and the lever position sensor is connected to the clutch lever to output the clutch signal according to a state of the clutch lever.

16. The electronic gear-shifting system with sound effects and display as claimed in claim 11, wherein the vehicle controller is preset with motor characteristic curves corresponding to different gear positions, and the motor characteristic curves include relationships between motor torque values and real speeds; wherein
the motor torque value corresponds to a neutral is zero;
the motor torque value is higher and a maximum value of the real speed is lower when in a low gear position and at a low speed; and
the motor torque value is lower and the maximum value of the real speed is higher when in a high gear position and at a low speed.

17. The electronic gear-shifting system with sound effects and display as claimed in claim 11, wherein the control unit computes the virtual speed according to the real speed of the power motor and controls the dashboard and the sound effect controller according to the virtual speed to generate corresponding outputs.

18. The electronic gear-shifting system with sound effects and display as claimed in claim 17, wherein a first calculation mode and a second calculation mode are built in the control unit, and the first calculation mode is configured to calculate the virtual speed in the condition that the electric motorcycle is in neutral and the electronic clutch unit is not triggered; and the second calculation mode is configured to calculate the virtual speed in the condition that the electric motorcycle is in the neutral or the electronic clutch unit is triggered.

19. The electronic gear-shifting system with sound effects and display as claimed in claim 11, wherein the sound effect controller performs sound effects control according to the virtual speed;
the volume output by the sound effect speaker is louder and the sound frequency is higher when the virtual speed is higher;
the volume output by the sound effect speaker is smaller and the sound frequency is lower when the virtual speed is lower.

20. The electronic gear-shifting system with sound effects and display as claimed in claim 11, wherein the dashboard receives the communication data transmitted by the control unit, and the dashboard is configured to display the target gear position, the virtual speed and a vehicle speed;

the control unit controls the dashboard to display a suggested upshift prompt light when the control unit determines the real speed of the power motor reaches a suggested upshift speed of each gear position; the control unit controls the dashboard to display a restricted downshift prompt light when the control unit determines that the real speed of the power motor is still higher than a restricted downshift speed of each gear position and the electronic shift units is operated to perform downshift; and the control unit restricts the electronic shift unit to be operated until the real speed is lower than the restricted downshift speed.

* * * * *